Patented Feb. 3, 1953

2,627,511

UNITED STATES PATENT OFFICE 2,627,511

ANTIOXIDANT FOR PETROLEUM PRODUCTS

Allen R. Jones, Roselle, and John O. Smith, Jr., North Plainfield, N. J., assignors to Standard Oil Development Company, a corporation of Delaware No Drawing. Application August 30, 1950, Serial No. 182,422

11 Claims. (Cl. 252—48.2)

This invention relates to additives for use in stabilizing organic materials which are susceptible to oxidation on contact with air or oxygen, and particularly for use in mineral lubricating oils and other petroleum hydrocarbon products.

It is well known in the art to utilize various addition agents in organic compositions in order to prevent the oxidation of the latter, which results in the production of undesirable degradation products such as peroxides, acidic materials, sludge, varnish-like deposits, and the like. This is particularly the case with respect to hydrocarbon products, both saturated and unsaturated, which are utilized as diesel fuels, motor fuels, and lubricants, including instrument oils, turbine oils, motor oils, greases, emulsifiable oils, and the like. These products are often subject to severe operating conditions of temperature and pressure which tend to aggravate the oxidation reaction. Furthermore, oxidation of the product, either during storage or use, causes undesirable results with respect to the metal surfaces, such as the parts of an internal combustion engine in which the products are used. Corrosion and pitting of the metal surfaces occur as well as various other effects which hinder the efficient operation of the engine. A new class of oxidation inhibitors has been discovered which efficiently reduce the undesirable effects of the oxidation reaction and which are particularly effective in reducing corrosion of metal surfaces and in inhibiting the tendency of oil to produce an insoluble sludge. The inhibitors are also effective in other types of oil products such as fuel oils, in which they reduce the tendency of the oil to darken and to produce sludge.

The new class of oxidation inhibitors may be described as organic products formed by the reaction of an aryl sulfonyl halide and an alkali metal mercaptide in equimolar amounts resulting in the splitting out of the alkali metal halide, and the removal of the latter from the organic reaction product. The exact structure of the reaction product has not been determined, but it is possible that the product has the composition illustrated by the formula—

where R represents the organic group of the alkali metal mercaptide.

The aryl sulfonyl halide employed in preparing the additives of the present invention may be any compound of the general structure—

where Ar is an aryl group and X is a halogen. The aryl nucleus may be a single benzene ring, or it may be a combination of two or more such rings, as in diphenyl, or it may be a condensed nucleus such as in naphthalene. These nuclei may have attached one or more alkyl radicals containing 1 to 20 carbon atoms each, and other groups or atoms may be present which are inert in the reaction with the mercaptide, such as halogen atoms or nitro groups. Examples of suitable aryl sulfonyl halides include the following: benzene sulfonyl chloride, benzene sulfonyl bromide, 2-toluene sulfonyl chloride, 3-toluene sulfonyl chloride, 2-ethylbenzene sulfonyl chloride, 4-isopropyl benzene sulfonyl chloride, 4-tert.-butyl benzene sulfonyl chloride, 2,3-dimethyl benzene sulfonyl chloride, 2-biphenyl sulfonyl chloride, α-naphthalene sulfonyl chloride, β-naphthalene sulfonyl chloride, 2-chlorobenzene sulfonyl chloride, 4-chlorobenzene sulfonyl chloride, 2,4-dichlorobenzene sulfonyl chloride, 2-bromobenzene sulfonyl chloride, 1-chloro-β-naphthalene sulfonyl chloride, 2-nitro-benzene sulfonyl chloride, p-toluene sulfonyl bromide, 4-chloronaphthalene sulfonyl bromide, and benzene sulfonyl iodide.

The alkali metal mercaptide which is reacted with the aryl sulfonyl halide in accordance with the present invention may be any compound of the type—

MSR where M represents an alkali metal and R represents a hydrocarbon group which may be an alkyl, alkaryl or aralkyl group containing 5 to 30, and more preferably 10 to 30 carbon atoms. Examples of suitable mercaptides include sodium n-amyl mercaptide, potassium n-octyl mercaptide, sodium lauryl mercaptide, potassium lauryl mercaptide, sodium hexadecyl mercaptide, sodium octadecyl mercaptide, sodium eicosyl mercaptide, sodium thiocresylate, sodium tert.-octyl thiophenolate, sodium 2-phenylethyl mercaptide, and the like.

The reaction between the aryl sulfonyl halide and the alkali metal mercaptide takes place readily at temperatures ranging from 20 to 100° C., preferably in the presence of an inert solvent such as acetone, ethyl alcohol, isopropanol, methyl ethyl ketone, ethyl acetate, and the like. The time required for the completion of the reaction will vary according to the reactants and the temperature, and may be from one-half to ten hours. The by-product alkali metal halide normally precipitates from the solution and may be readily removed by filtration. The solvent may be removed by heating and evaporating a steam bath or under vacuum at atmospheric pressure or by blowing with an inert gas such as nitrogen.

The quantity of the additives of the present invention which may be most advantageously blended in mineral lubricating oils or other petroleum hydrocarbon products will depend upon the nature of the base oil to which they are added and upon the conditions to which the oil is to be subjected in use or in storage. Generally, the amount which may be advantageously employed will vary from about 0.05 to 2%, although quantities as great as 5% may, upon occasion, be used.

The following examples illustrate the preparation and testing of an example of the additives of the present invention, but it is to be understood that these examples are illustrative only and should not be considered as limiting the scope of the invention in any way.

*Example 1.—Preparation of additives*

7.2 g. (0.0366 mol) of benzene sulfonyl chloride and 8.8 g. (0.0366 mol) of potassium lauryl mercaptide dispersed in 12.6 g. of toluene were mixed with 100 ml. of acetone and refluxed for two hours. The mixture was filtered hot and the precipitate washed with hot acetone, leaving a residue of 3.1 g. of KCl. The filtrate was concentrated on a steam bath, cooled and filtered to remove the precipitated product. There was obtained a yield of 15.5 g. of a white crystalline solid which melted slowly on standing at room temperature.

*Example 2.—Staeger oxidation test*

Lubricating oils were prepared by adding small quantities of the product prepared as described in Example 1 to a turbine oil consisting of a solvent extracted Mid-Continent oil having a Saybolt viscosity of 43 seconds at 210° F., with and without the presence of 0.2% of 2,6-di-tert.-butyl-4-methyl phenol and in each case with the further addition of 0.06% by weight of a zinc naphthenate corrosion inhibitor were tested in accordance with a modified Staeger oxidation test, which was conducted as follows:

A 200 ml. sample of oil was stored in a rotating shelf oven maintained at 110°±1° C. A 40 x 70 mm. freshly polished copper strip was placed in the 400 ml. oil container to serve as an oxidation catalyst. The strip was removed every 72 hours and a clean strip substituted. During the test the shelf rotated at an angular velocity of 4–6 R. P. M. and a positive ventilation of 1.5 to 2.0 cu. ft. of air per hour was maintained. The oil samples were periodically withdrawn from the container and the neutralization number was determined. The oxidation life of the sample is defined as the time in hours required to obtain an increase in neutralization number of 0.02 mg. KOH/g.

A sample of the base oil alone, without zinc naphthenate, showed a life of 65 hours, while the same with 0.06% zinc naphthenate showed a life of 30 hours. The results obtained in similar tests of samples of the base oil with 0.06% zinc naphthenate and 0.2 or 0.4% of the product obtained in Example 1, with and without the further addition of 0.2% of 2,6-di-tert.-butyl-4-methyl phenol, are shown in the following table:

TABLE I

| Antitoxidant | Concentration (wt. percent) | Staeger Oxidation Life (hrs.) | |
| --- | --- | --- | --- |
| | | Base Oil Alone [1] | Base Oil [1] + 0.2% 2,6-Di-tert.-butyl-4-methyl-phenol |
| None | 0.0 | 30 | 210 |
| 2,6-Di-tert.-butyl-4-methyl-phenol | 0.4 | 475 | |
| Product of Example 1 | 0.2 | | 475 |
| Do | 0.4 | 125 | |

[1] Containing 0.06% by weight of zinc napththenate.

It may be noted that the product of Example 1 has a synergistic effect on the influence of 2,6-di-tert.-butyl-4-methylphenol, since 0.2% of the phenol alone gave a life of 210 hours and the addition of 0.2% of the product of Example 1 increases this time to 475 hours. It would be expected that addition of 0.2% of the product of Example 1 would increase the life time by about 50 hours instead of the 245 hours actually obtained.

*Example 3.—S. O. D. bearing corrosion test*

A sample of a well-refined solvent extracted paraffinic mineral lubricating oil of SAE 20 viscosity grade containing 0.25% by weight of the product of Example 1 and a sample of the unblended base oil were submitted to the S. O. D. bearing corrosion test, which was conducted as follows: 500 cc. of the oil sample was maintained at 325° F. and aerated with 2 cu. ft. of air per hour. A steel shaft to which was affixed to one-quarter copper-lead bearings with a total bearing area of 4.5 sq. in. rotated at 600 R. P. M. with the bearings immersed in the oil. The test was run for 4 hours and the loss of weight of the bearings determined.

The bearings were repolished and reweighed and the test continued for additional 4-hour periods in like manner. The bearing corrosion life is the number of hours at which the cumulative weight loss becomes 100 mg., determined by interpolation of the data obtained in the various 4-hour periods. The results of the tests were as follows:

TABLE II

| Oil Composition | Bearing Corrosion Life (Hrs.) |
| --- | --- |
| Base oil alone | 9 |
| Base oil + 0.25% product of Example 1 | 26 |

The lubricating oil base stocks used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may be used. Also, for special applications, animal, vegetable or fish oils or their hydrogenated or voltolized products may be employed in admixtures with mineral oils.

For the best results the base stock chosen should normally be an oil which with the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, antioxidants, thickeners, viscosity index improvers, oiliness agents, resins, rubber, olefin polymers, and the like.

Assisting agents which are particularly desirable as plasticizers and defoamers are the higher alcohols having preferably 8–20 carbon atoms, e. g., octyl alcohol, lauryl alcohol, stearyl alcohol, and the like.

In addition to being employed in lubricants, the additives of the present invention may also be used in other mineral oil products such as motor fuels, fuel oils, hydraulic fluids, torque converter fluids, cutting oils, flushing oils, turbine oils, transformer oils, industrial oils, process oils, waxes and the like, and generally as antioxidants in mineral oil products. They may also be used in gear lubricants, greases and other products containing mineral oils as ingredients.

What is claimed is:

1. A mineral oil composition containing an oxidation inhibiting amount of a product obtained by reacting substantially equimolar amounts of an aryl sulfonyl halide and an alkali metal mercaptide at a temperature of 20 to 100° C., the organic group of said mercaptide being an alkyl group containing 5 to 30 carbon atoms.

2. A composition according to claim 1 in which the petroleum hydrocarbon product is a mineral lubricating oil.

3. A composition according to claim 2 in which the aryl sulfonyl halide is benzene sulfonyl chloride.

4. A composition according to claim 3 in which the organic group of the alkali metal mercaptide is a lauryl group.

5. A mineral lubricating oil containing an oxidation inhibiting amount of the product obtained by reacting substantially equimolar amounts of benzene sulfonyl chloride and potassium lauryl mercaptide in acetone solution at the refluxing temperature, removing the by-product potassium chloride by filtration, and removing the acetone by evaporation.

6. As a new composition of matter the product obtained by reacting substantially equimolar amounts of an aryl sulfonyl halide and an alkali metal mercaptide at a temperature of 20 to 100° C., the organic group of said mercaptide being an alkyl group containing 5 to 30 carbon atoms.

7. A composition according to claim 6 in which the aryl group of the aryl sulfonyl halide is a benzene nucleus.

8. As a new composition of matter the product obtained by reacting substantially equimolar amounts of a benzene sulfonyl chloride and an alkali metal lauryl mercaptide at a temperature of 20 to 100° C.

9. As a new composition of matter a product obtained by reacting substantially equimolar amounts of benzene sulfonyl chloride and potassium lauryl mercaptide in acetone solution at the refluxing temperature, removing the by-product potassium chloride by filtration, and removing the acetone by evaporation.

10. A composition according to claim 4 containing in addition an oxidation inhibiting amount of 2,6-di-tert.-butyl-4-methyl phenol.

11. A composition according to claim 10 which contains in the range of 0.05 to 5.0% by weight of said reaction product and in the range of about 0.2–0.4% by weight of said phenol.

ALLEN R. JONES.
JOHN O. SMITH, Jr.

REFERENCES CITED

The following references are of record in the file of this patent:

UNITED STATES PATENTS

| Number | Name | Date |
|---|---|---|
| 2,257,969 | Loane et al. | Oct. 7, 1941 |
| 2,314,379 | Zenveck et al. | Mar. 23, 1943 |
| 2,318,629 | Prutton | May 11, 1943 |
| 2,470,077 | Fincke | May 10, 1949 |